(12) United States Patent
Asbeck et al.

(10) Patent No.: US 11,793,703 B2
(45) Date of Patent: Oct. 24, 2023

(54) LIFT-ASSISTANCE EXOSKELETON

(71) Applicant: Virginia Tech Intellectual Properties, Inc., Blacksburg, VA (US)

(72) Inventors: Alan T. Asbeck, Blacksburg, VA (US); Taylor Pesek, Christiansburg, VA (US); Timothy Pote, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 140 days.

(21) Appl. No.: 16/834,086

(22) Filed: Mar. 30, 2020

(65) Prior Publication Data

US 2021/0298985 A1 Sep. 30, 2021

(51) Int. Cl.
*A61H 3/00* (2006.01)
*A61H 1/02* (2006.01)

(52) U.S. Cl.
CPC ............. *A61H 3/00* (2013.01); *A61H 1/0262* (2013.01); *A61H 2003/007* (2013.01); *A61H 2201/1418* (2013.01); *A61H 2201/1642* (2013.01); *A61H 2201/1652* (2013.01)

(58) Field of Classification Search
CPC .. A61H 3/00; A61H 1/0262; A61H 2003/007; A61H 2201/1418; A61H 2201/1642; A61H 2201/1652
See application file for complete search history.

(56) References Cited

U.S. PATENT DOCUMENTS

| | | | | |
|---|---|---|---|---|
| 10,870,198 | B1* | 12/2020 | Asbeck | A61H 1/02 |
| 2002/0094919 | A1* | 7/2002 | Rennex | A61H 3/008 |
| | | | | 482/124 |
| 2008/0287850 | A1* | 11/2008 | Adarraga | A63C 9/00 |
| | | | | 602/26 |
| 2014/0276264 | A1* | 9/2014 | Caires | B25J 9/0006 |
| | | | | 601/34 |
| 2015/0051527 | A1* | 2/2015 | Potter et al. | A61H 1/02 |
| 2015/0209215 | A1* | 7/2015 | Lee | A61H 3/008 |
| | | | | 623/27 |

(Continued)

OTHER PUBLICATIONS

U.S. Appl. No. 15/464,616, entitled " Back Exoskeleton to Assist Lifting," filed Mar. 21, 2017.

*Primary Examiner* — Keri J Nelson
*Assistant Examiner* — Aren Patel
(74) *Attorney, Agent, or Firm* — Thomas | Horstemeyer, LLP

(57) ABSTRACT

An exoskeleton system and associated components are described herein. The exoskeleton system assists a user in lifting and/or bending to perform various operations. Components of the exoskeleton system can include a force device, a release mechanism, and a leg differential system. The force device includes a gas spring and a compression spring to store and release energy to assist a user of the exoskeleton system, the force device having a smooth force profile with no initial loading. The release mechanism disengages and re-engages the force device when actuated by a user. The leg differential system enables walking while wearing the exoskeleton system and equally loads different force devices of the exoskeleton system when a user's legs are displaced relative to one another.

21 Claims, 14 Drawing Sheets

(56) References Cited

U.S. PATENT DOCUMENTS

| | | | |
|---|---|---|---|
| 2015/0321342 A1* | 11/2015 | Smith | B25J 9/0009 |
| | | | 74/490.03 |
| 2018/0177670 A1* | 6/2018 | Shim | A63B 21/068 |
| 2018/0280178 A1* | 10/2018 | Shimada | B25J 9/1045 |
| 2019/0380903 A1* | 12/2019 | Zhu | A61H 1/0277 |
| 2021/0251781 A1* | 8/2021 | Battlogg | A61F 2/70 |

* cited by examiner

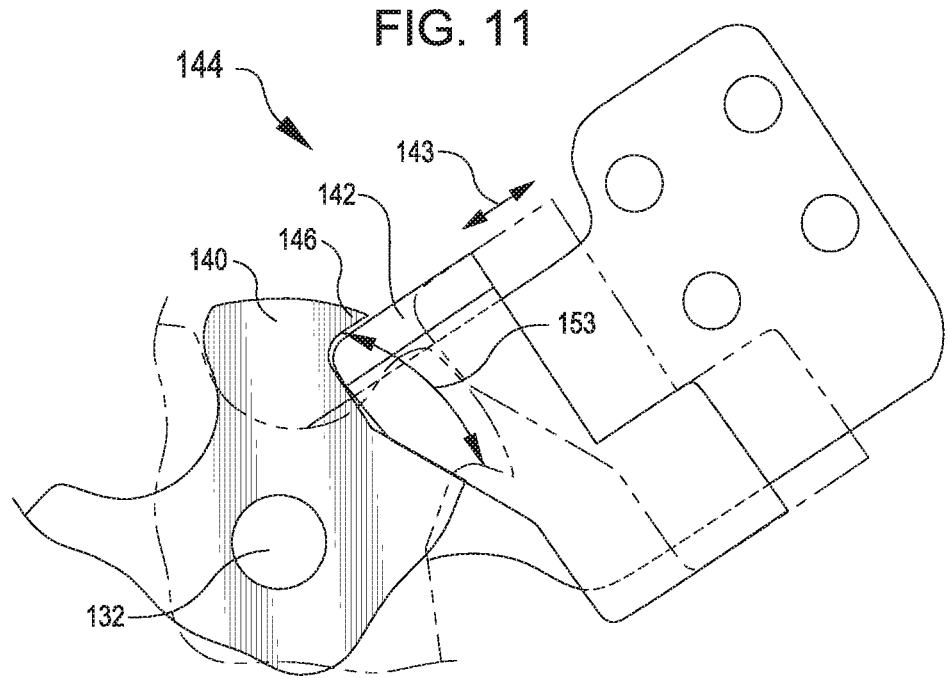

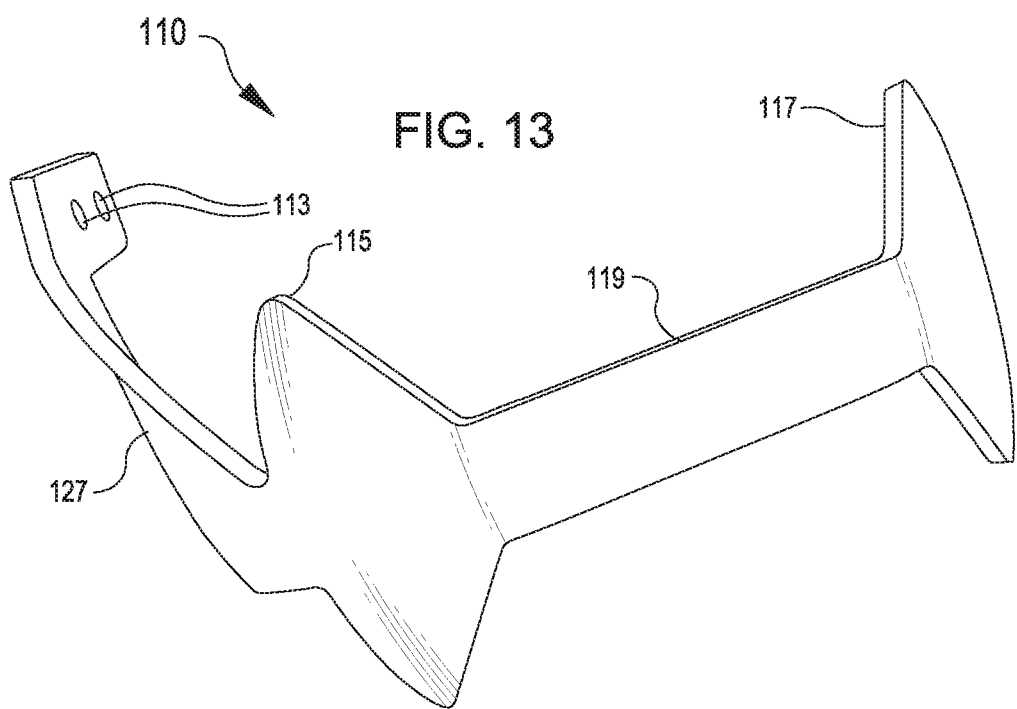

LIFT-ASSISTANCE EXOSKELETON

BACKGROUND

Some physical activities require participants to perform at the limit of their physical ability. Movers, workers, or other persons engaged in physical labor may repeatedly lift heavy loads over long durations and such tasks might be easier with assistance. Other examples exist of populations and activities that each may require more physical ability than is available to members of the population or to participants in the activities.

SUMMARY

Techniques and devices described herein are directed to a wearable exoskeleton and components thereof useful for assisting a user in actions or applications that involve bending or lifting. Systems and devices herein provide improvements and additional features for an exoskeleton either as part of, or as standalone add-ons for, existing exoskeleton systems.

In some examples, the disclosure is directed to an exoskeleton system useful for applications requiring bending over and lifting of objects. Some examples include unloading boxes, moving boxes or heavy items, stocking shelves, delivering packages, picking agriculture, and construction. The exoskeleton system includes several components that provide functionality and features to enhance the use and function of the system.

In some examples, the exoskeleton system includes a leg differential system for accounting for uneven or unequal leg placement, including a walking motion. The leg differential system may include components such as a cam located at or near a hip joint of the exoskeleton system on each leg, with a cable connecting each of the cams. The leg differential system may also incorporate one or more force devices and/or energy storage/producing devices such that a walking motion of a user does not engage or activate the force device. The force device, which is engaged during lifting and/or bending activities, may be incorporated such that it provides substantially equal force loading on force devices located on each leg of the exoskeleton system.

In some other examples, a force device for the exoskeleton is described. The force device of the exoskeleton system is used to store energy when a user bends, squats, or sits, which energy is then used to assist the user in returning to a vertical or standing position. The force device has no initial loading, so a user of the system does not have to exert energy against a system pre-loading. The force device includes components, such as a gas spring and a compression spring, to provide a smooth force profile while maintaining a larger range of motion than a single compression spring would provide.

In some further examples, the exoskeleton system includes a release mechanism for disengaging the force and/or energy storing devices of the system to allow free movement of a user without removing the exoskeleton system and without needing to resist any forces or energy stored in the energy storage devices. In some situations, a user may want to sit, such as to eat a meal, take a break, or operate machinery such as a forklift but the user may not wish to remove the exoskeleton because they will be returning to lifting or moving activities shortly. The release mechanism allows a user to disengage the force device and then, upon standing, the exoskeleton system may automatically re-engage to resume lift-assistive operation.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. The illustrative examples are given to introduce the reader to the general subject matter discussed herein and not intended to limit the scope of the disclosed concepts. The following sections describe various additional examples and examples with reference to the drawings in which like numerals indicate like elements and directional description are used to describe illustrative examples but, like the illustrative examples, should not be used to limit the present disclosure.

BRIEF DESCRIPTION OF THE DRAWINGS

Various examples in accordance with the present disclosure will be described with reference to the drawings, in which:

FIG. 11 depicts a detail view of the release mechanism of FIG. 6 in both an engaged and a released position, according to at least one example;

FIG. 13 depicts a thigh pad structure, according to at least one example.

DETAILED DESCRIPTION

Examples of the present disclosure relate to an exoskeleton for applications in which a user might bend and lift objects. Specifically, the present disclosure relates to components and elements of an exoskeleton for providing force or energy for assisting a user, allowing a user to disengage the force elements, and a differential system. These components enable the exoskeleton to aid a user, who is wearing the exoskeleton, in various bending and lifting tasks while still allowing the user some flexibility, comfort, and improved performance from the components of the exoskeleton. As used herein, "exoskeleton" means a wearable device designed to work in tandem with a user. For example, an exoskeleton is worn or placed on the body of the user and acts to amplify, augment, reinforce, restore, or otherwise work in connection with the user's movements. The exoskeleton may be powered or be entirely passive and based on purely mechanical systems or some combination thereof. In some examples, the exoskeleton may cover an entire body of a user, while in other examples only a portion of the user, such as the lower body, upper body, or torso may be covered and/or assisted by the exoskeleton.

Various components of an exoskeleton are described herein, as well as their benefits and improvements over typical systems and components. The components described herein include: a force element which provides force or resistance for a function of the exoskeleton, a leg differential system for accommodating various leg positions and orientations while still assisting a user (e.g., uniformly assisting), and a release mechanism for disengaging a force device of the exoskeleton to allow a user to bend or sit without engaging the force element.

Figure 1:
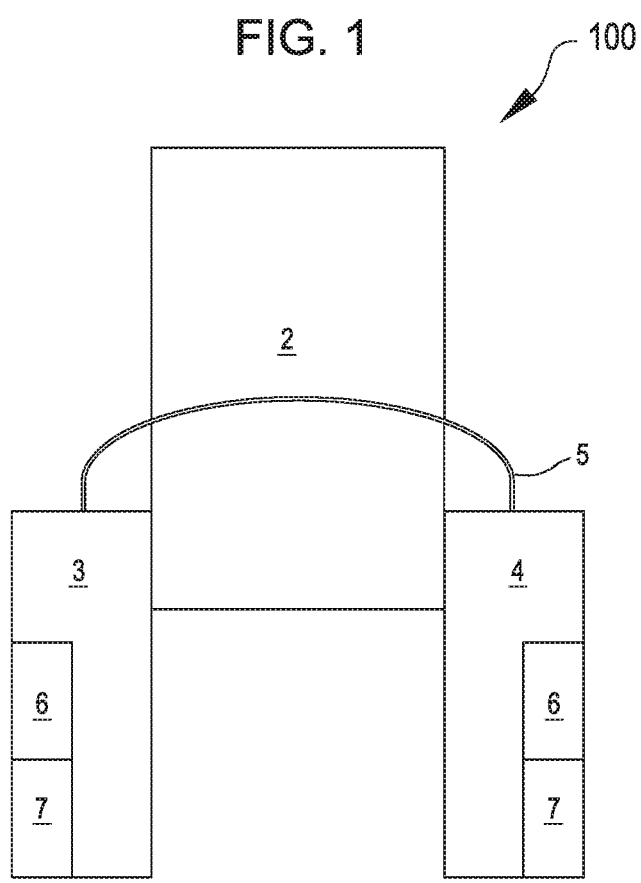
FIG. 1 is a block diagram showing elements of an exoskeleton worn by a user in accordance with at least one example.

Turning now to the figures, FIG. 1 depicts a block diagram of an exoskeleton system 100 to be worn by a user according to at least one example. Exoskeleton system 100 includes a harness 2, a left leg assembly 3, a right leg assembly 4, and a differential cable 5 connecting the left leg assembly 3 and right leg assembly 4. Specifically, differential cable 5 connects force device 7 of the right leg assembly 4 to force device 7 of the left leg assembly 3. In some embodiments, force release 6 may connect between force device 7 and differential cable 5. Each of the right leg assembly 4 and left leg assembly 3 include a force release 6 and a force device 7. Harness 2 secures the exoskeleton system 100 to a user. Harness 2 may include buckles, straps, securement devices, belts, and/or other devices for connecting and securing objects to a user's body. Harness 2 may include a waist belt and/or shoulder straps as well as a rigid or semi-rigid frame which secures to the upper body of the user.

Exoskeleton system 100 secures to a user's torso at harness 2 and also releasably attaches to the legs of the user at the right leg assembly 4 and left leg assembly 3 with either releasable attachments such as hook-and-loop fasteners (e.g., Velcro-branded fasteners) and/or straps or through contact pads such as a thigh pad described below with respect to FIG. 2. When secured to the user, exoskeleton system 100 provides energy storage capacity in each of the force devices 7. When a user's legs are bent in an action such as bending for lifting, the force device 7 stores energy as the user's legs are bent and releases energy to assist in straightening the user's legs.

In some examples, harness 2 may only secure to a waist portion of a user while in some other examples, harness 2 may secure to an upper body and/or shoulder of a user. Additionally, in some examples, exoskeleton system 100 may include force device 7 in the left leg assembly 3 and right leg assembly 4 but not force release 6 and may also be configured without differential cable 5.

Figure 2:
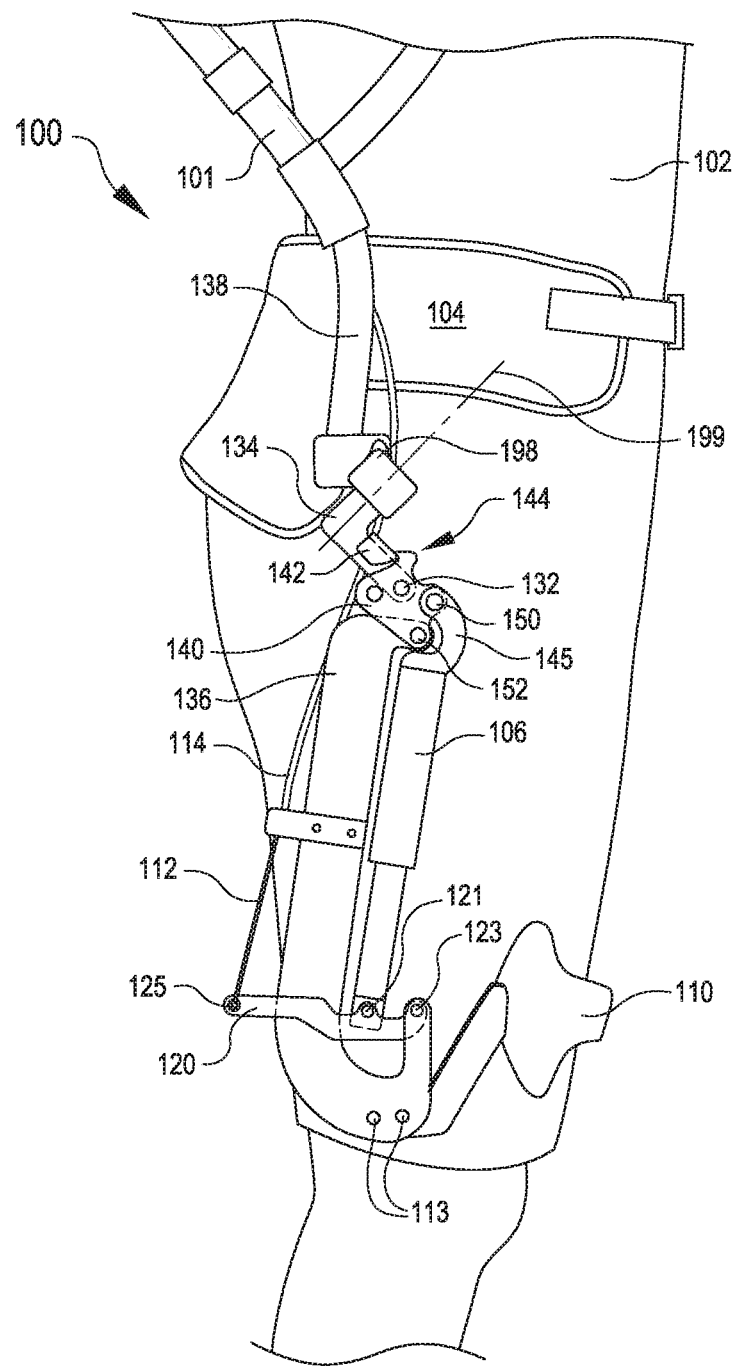
FIG. 2 is a side view of a portion of an exoskeleton worn by a user in accordance with at least one example.

FIG. 2 depicts a portion of an example embodiment of exoskeleton system 100 worn by a user 102 according to at least one example. Specifically, the lower portion of the exoskeleton system 100 is shown below the waist of the user 102 excluding a majority of harness 2 as described in FIG. 1 which may be connected to the upper body of user 102. The exoskeleton system 100 may alternatively or additionally include components to secure to the shoulders and/or upper body of the user 102, though such components are not shown. The exoskeleton system 100 secures to a waist of a user 102 with a waist belt 104 and also contacts or secures to the body of the user 102 at the front of the thigh, through a thigh pad 110 or other leg attachment. There may be additional securing straps around or behind the thigh, leg, or seat of the user 102 at other positions to secure the exoskeleton system 100 to the user 102.

The exoskeleton system 100 includes a number of struts, such as an upper frame 138 which extends from the buttocks upward and rearward towards the upper body of the user 102, a leg strut 136 along the side of the thigh of the user 102, and a hip strut 134 connected to the upper frame 138 at a lateral joint 198 and to the leg strut 136 at a hip joint 152. The left leg assembly 3 and right leg assembly 4 of FIG. 1 may each comprise a leg strut 136 and hip strut 134 and may also include thigh pad 110 as well as force device 106 and release mechanism 144 which each correspond, respectively, to force device 7 and force release 6 of FIG. 1.

Lateral joint 198 connects the hip strut 134 to the upper frame 138 and allows rotation of the hip strut 134 relative to the upper frame 138 about axis 199. The rotation about axis 199 of the lateral joint 198 allows the leg assembly to adjust with horizontal movement of a user's legs, such as when squatting. For example, when squatting to lift an object, often a user's knees will move outwardly, with the thighs splaying outwardly away from the front of the user. The lateral joint 198 enables the exoskeleton system 100 to move with the user through this motion and assist in lifting. Additionally, the lateral joint 198 can be used to don the exoskeleton system 100 by connecting the upper portion of the exoskeleton system 100 to the user 102 and rotating the lateral joint 198 to spread the leg assemblies so the thigh pad 110 can be brought around to the front of a user's leg. When removing the exoskeleton system 100 the same rotation at lateral joint 198 allows the user to remove the thigh pad 110 and rotate it laterally away from the centerline of the user's body 102 to disconnect and remove the exoskeleton system 100. Axis 199 is shown at an angle of approximately forty-five degrees when compared to a vertical axis of a user 102 in an upright position, located in a parasagittal plane of the user 102 or in a plane close to a parasagittal plane. Having axis 199 angled away from vertical enables the leg assemblies to more closely follow the complex motion of a hip as a user moves. Other angles with respect to the vertical may be used, including angles in a range of thirty to sixty degrees.

The hip strut 134 and leg strut 136 connect (albeit indirectly) the thigh pad 110 and waist belt 104 to provide a structure through which force may be stored and used to assist a user 102 in lifting or bending at the hip. The thigh pad 110 connects to the leg strut 136 at connections 113 by an attachment device such as a rivet, screw, or other such device. Hip strut 134 extends from the upper frame 138 of the exoskeleton system 100 to the hip joint 152. Hip strut 134 includes release mechanism 144 to couple the hip strut 134 to the hip joint 152. The hip strut 134 and leg strut 136 are rotationally coupled to one another at the hip joint 152. The rotational couplings may be achieved through the use of hinges, pins, bearings, or other rotational devices. The rotational coupling at the hip joint 152 allows rotation of the hip strut 134 and leg strut 136 relative to each other. The hip joint 152 is located to align or to closely align with the hip joint of the user 102.

The hip joint 152 is designed and shaped to mimic and act in a manner similar to a hip of the user 102 and may therefore include multiple hinges, struts, pivots, or other such components to achieve that motion that may not be included in the examples described herein. The hip strut 134 extends around from the upper frame 138 at lateral joint 198 to the lateral sides of the user's body adjacent to the user's hip where the hip strut 134 meets the hip joint 152 of the exoskeleton system 100. At the hip joint 152, the release mechanism 144 (described in further detail with respect to FIGS. 6 and 11) may form part of the connection of the hip strut 134 to the hip joint 152. The hip joint 152 includes a rotation and/or pivot point as described above. Finally, the force device 106 is distally mounted to the release mechanism 144 at a distal end of the hip strut 134 such that the rotation of the hip joint 152 in one direction compresses the force device 106, whereas rotation in the opposite direction allows the force device 106 to extend longitudinally. The connection point 150 of the force device 106 is offset or out of line of the hip joint 152 so that a moment is formed around the hip joint 152 to provide force to the force device 106 as the leg strut 136 134 rotates about the hip joint 152 (clockwise in the view of FIG. 2). The upper end of the force device 106 is connected to the release mechanism 144 at connection point 150 near the hip joint 152. The bottom end of force device 106 is connected to the leg strut 136 through a rocker bar 120 such that rotation of the leg strut 136 in a first direction (clockwise in FIG. 2) about at the hip joint 152 applies force to the force device 106 to store energy and rotation in an opposite direction (counter-clockwise in FIG. 2) releases energy to assist the rotation at the leg strut 136 about the hip joint 152. In some configurations, the force device 106 may be in different locations and/or connected to the leg strut 136 or hip strut 134 through other components such as plates or additional struts.

The rocker bar 120 is coupled to the force device 106 at pivot connection 121 and to the leg strut 136 at pivot connection point 123 at a lower tip of the leg strut 136. On the opposite end of rocker bar 120 from pivot connection point 123 is a connection 125 for connecting a differential cable 112 which connects a rocker bar 120 on the right leg to a rocker bar 120 on the left leg of the exoskeleton system 100. The differential cable 112 is sheathed in sheath 114 for at least part of the length of the differential cable 112 to prevent rubbing against other elements of the exoskeleton system 100. The sheath 114 also allows sliding of the differential cable 112 longitudinally through sheath 114 while confining lateral movement of the differential cable 112 to the inside of the sheath 114. Because each end of the sheath 114 is fixedly attached to a respective one of the leg struts 136 (on opposite sides of the user 102), when the differential cable 112 slides a particular distance into one end of the sheath 114, a substantially equal amount of differential cable 112 is pushed out of the opposite end of the sheath 114, thereby actuating rocker bars 120 on opposite sides of the user 102 to pivot about pivot connection points 123 in opposite directions. The differential cable 112 accounts for uneven leg placement or bending and allows the user 102 to walk while wearing the exoskeleton system 100 without applying compressive force to the force device 106. The action movement of the differential cable 112 accounts for different leg placement and is described with respect to FIGS. 3 through 7 below.

The force device 106 shown in FIG. 2 provides resistance and/or stores energy when the exoskeleton system 100 is in use. In some examples, the force device 106 may be an energy storage device such as a spring. In the example shown in FIG. 2, the force device 106 is in an unloaded or near zero load state when the hip and thigh of the user are in line with the upper body. When the user bends at the hip, as described below, the hip joint 152 allows movement of the struts of the exoskeleton system 100 relative to one another. The leg strut 136 is eccentrically attached to the hip strut 134 (via release mechanism 144) at the hip joint 152 so that rotation of the hip strut 134 drives a lever arm 145 of the force device 106 downward, compressing the force device 106, and storing energy that may be used for lifting and/or straightening the body of the user 102. The force may provide an assistive torque through the use of a cam or lever arm 145. The assistive torque may provide additional torque to aid the user 102 in bending and/or straightening via the hip joint 152. For example, the assistive torque may aid the user 102 to return to a standing and/or vertical position from a bending position and/or lifting position. In some examples, the force device 106 may be pre-loaded so the exoskeleton system 100 is configured to begin loading the force device 106 once any bending or rotation occurs at the hip, rather than having slack in the system to take up before loading the force device 106.

At the connection point 150, the force device 106 connects to the release mechanism 144. The release mechanism 144 allows the user 102 to disengage the force from the exoskeleton by allowing the force device 106 and associated elements of the force production mechanism and hip joint to rotate with respect to hip strut 134 around pivot point 132. Alternately, in some examples, the release mechanism 144 may enable the user 102 to toggle or switch on/off the force device 106 to allow free rotation of the hip strut 134 at the hip joint 152 without loading/unloading the force device 106 when released and to re-engage to resume assistive operation of the exoskeleton system 100. The details of the release mechanism 144 are described with reference to FIG. 11, and alternative release mechanisms are described in FIGS. 9 through 12. Some release mechanisms are described herein which are located away from the hip joint 152, but which have the same function, to allow the user 102 to selectively release the force device 106 to allow free or un-assisted rotation of the hip strut 134 (or equivalent hip structure) at the hip joint 152.

Figure 3:
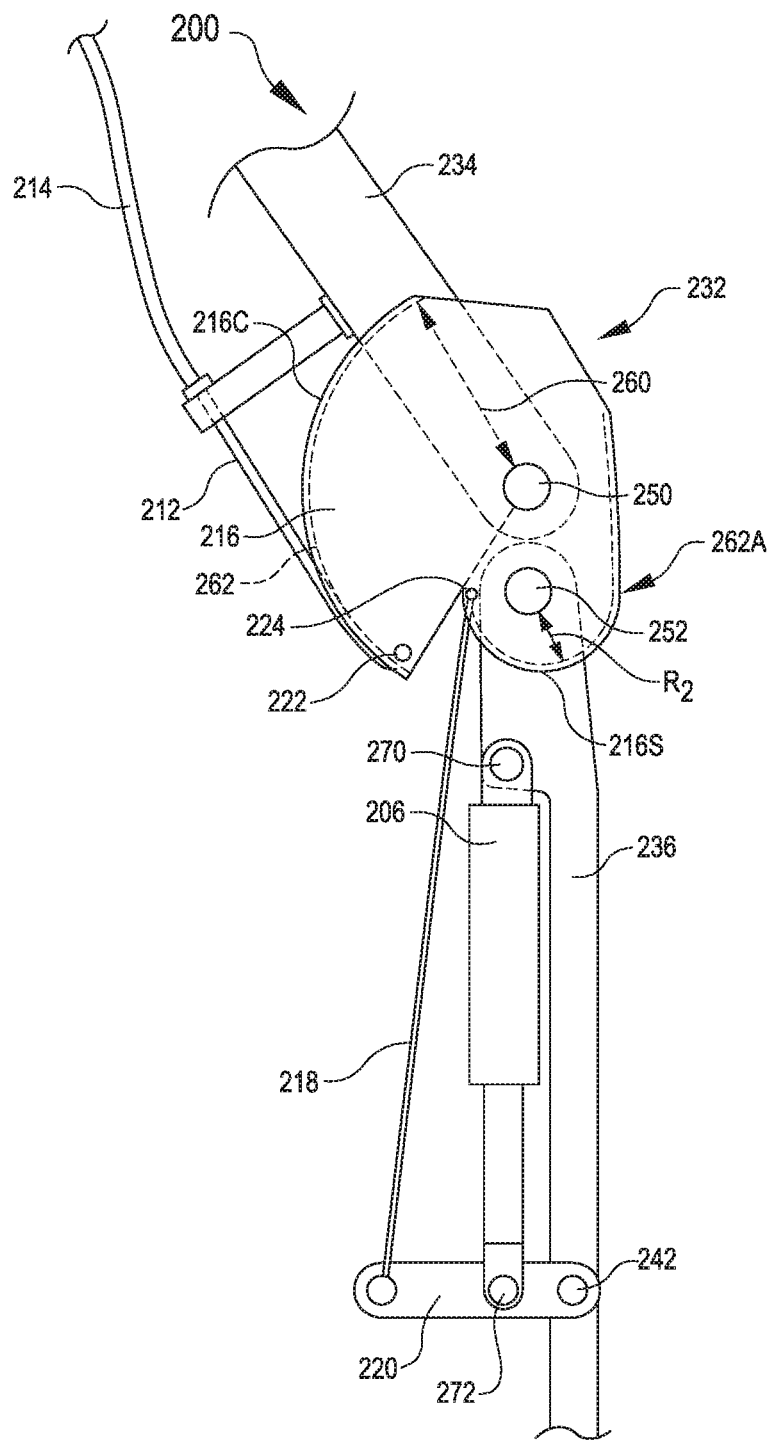
FIG. 3 is a partial cutaway, side view of an alternative leg assembly of an the exoskeleton, showing a leg differential cam system, according to at least one example.

FIG. 3 shows an illustration of an example portion of an alternative for leg assembly 200 of an embodiment of exoskeleton system 100 including a differential cable and cam system. The leg assembly 200 may be a left and/or a right leg assembly corresponding to left leg assembly 3 and right leg assembly 4 of FIG. 1. As shown, leg assembly 200 does not include a force release 6, though it may optionally be included with this configuration. The leg assembly 200 can be used in place of the structure shown in FIG. 2, and accordingly, similar parts include similar numbering in FIG. 3. The leg assembly 200 is connected to a hip strut 234 at the hip joint 232. The hip joint 232 allows rotational movement between the hip strut 234 and the leg strut 236 and includes a cam 216 which is rotationally mounted with pivot pins 250,252 to each of the hip strut 234 and the leg strut 236. The cam 216 has a curved portion 216C with a first radius 260 that is constant, though in some examples the curved portion 216C may be configured with one or more variations in radius with respect to the pivot pin 250.

A cable 212 is connected to one end of the curved portion 216C of the cam 216 at a first attachment point 222 at a first radius 260 or distance from the pivot pin 250 of the cam 216 and is routed along the curved portion 216C of the cam 216. The cable 212 is held in place along the edge of cam 216 in a groove 262 in which the cable 212 sits. The cable 212 is a differential cable for allowing each of the legs of the user 102 to rotate at the hip joint 232 in opposite directions without applying a force as described below. The cable 212 has a sheath 214 to protect the cable 212 from external forces or objects. The sheath 214 also prevents the cable 212 from being exposed and catching foreign matter which may interfere with operation of the cable 212. The sheath 214 allows sliding of the cable 212 longitudinally through sheath 214 while confining lateral movement of the cable 212 to the inside of the sheath 214. Because each end of the sheath 214 is fixedly attached to a respective one of the hip struts 234 (on opposite sides of the user 102), when the cable 212 slides a particular distance into one end of the sheath 214, a substantially equal amount of cable 212 is pushed out of the opposite end of the sheath 214, thereby actuating the cams 216 on opposite sides of the user 102 to pivot about pivot pins 250 in opposite directions.

The cam 216 is shown having two pivot pins, one at the pivot pin 252 which serves as connection point of the leg strut 236 and one at pivot pin 250 where the cam 216 is connected to the hip strut 234. The two pivot pins may provide a more natural hip motion, though in some examples the leg strut 236 and the hip strut 234 may be connected to the cam 216 at a single pivot point. When a user 102 walks while wearing the configuration shown in FIG. 3, each forward step creates tension on the cable 212 that pulls the cable 212 some distance out the end of the sheath 214 located nearest to the user's leg that is stepping forward. This, in turn, causes a portion of cable 212 (corresponding in length to the aforementioned distance) to be drawn into the end of the sheath 214 located nearest to the user's leg that lags behind the user during the forward step. This movement of the cable 212 causes the cams 216 on opposite sides of the user to pivot in opposite directions with each step. At a second attachment point 224, located at a second distance from the pivot pin 250 of the cam 216, and nearer to the pivot pin 252 where the leg strut 236 is connected to the cam 216, a tension cable 218 is attached to the cam 216. The cam 216 includes a second curved portion 216S with a groove 262A adapted to accommodate a portion of the tension cable 218. The tension cable 218 applies force from a force device 206 to the cam 216. The tension cable 218 connects to a bar 220 in a class three lever configuration, meaning a configuration where the force is applied between the load and the fulcrum, with the force device 206 in between the tension cable 218 and the pivot point 242 of the bar 220 where it attaches to the leg strut 236. This configuration of force device 206, bar 220, and tension cable 218 is configured to work with a compression style of the force device 206 such as a spring, gas spring, and/or other similar device configured to store energy upon compression, which may be alternative forms of the force device 206. In other embodiments, the cam 216 may increase the displacement of the force device 206 proportionally as the user bends over further and causes cam 216 to rotate further about the pivot pin 252. This can be accomplished by having a changing and/or different radius $R_2$ at different locations along the groove 262A or second curved portion 216S of the cam 216 or alternatively by including a portion designed to wrap and/or retain the tension cable 218 as the cam 216 rotates further about the pivot pin 252 to cause greater displacement of the force device.

Figure 4:
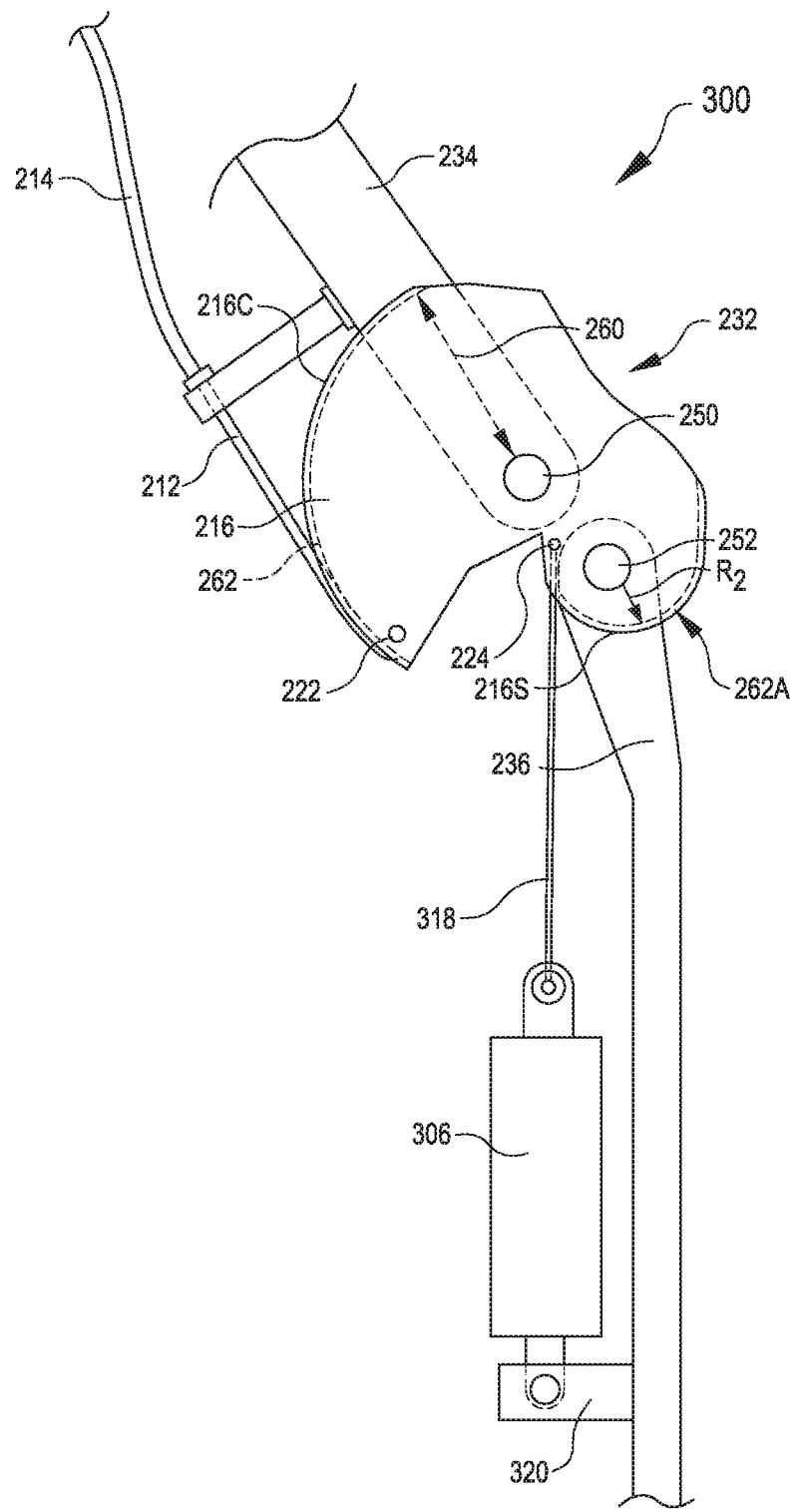
FIG. 4 is a partial cutaway, side view of an alternative leg assembly of an exoskeleton with a leg differential cam system, according to at least one example.

FIG. 4 shows an alternative for leg assembly 300 similar to the leg assembly 200 and also corresponding to left leg assembly 3 and/or right leg assembly 4, but incorporating a tension-type of the force device 306. Because the force device 306 stores energy when tension is applied, the tension cable 318 connects the cam 216 directly to the force device 306 rather than connecting to the bar 320 in a lever configuration. The leg assembly 300 has similar parts and components to those shown and described in FIG. 3, such as the cable 212, sheath 214, hip strut 234, leg strut 236, and cam 216. The leg assembly 300 may have fewer parts than the leg assembly shown in FIG. 3.

In some examples, the force device 306 may be a carbon fiber and/or leaf spring. The force devices 106 and 206 of FIGS. 2 and 3 may likewise be a carbon fiber and/or leaf spring. The leaf spring and/or carbon fiber spring may include a rigid material such as one or more carbon fiber rods or one or more spring steel sheets. The leaf spring may include a cam follower and be in contact with an edge or perimeter of the cam 216 to provide force into the system as the cam 216 rotates about the pivot pin 252 in response to a user bending over. With referenced to FIGS. 3 and 4, cam 216 may include a second curved portion 216S with a groove 262A adapted to receive a portion of the tension cable 218 as a user bends over so as to cause the cam 216 to rotate about the pivot pin 252. The second curved portion 216S and/or the groove 262A may, in some examples have an eccentric shape, or in other words a radius $R_2$ from the pivot pin 252 to inner wall of the groove 262A that varies along the extent of the groove 262A. The varying radius of the cam 216 may allow the cam 216 to displace or flex the force device 206 or 306 at varying rates per degree of cam 216 rotation. For example, an increase in the radius at a location along the groove 262A results in an increase in the rate of displacement or flexing of force device 206 or 308 when the tension cable 218 or 318 gets pulled into that location along the groove 262A. The eccentric shape of the cam 216 may be configured to cause a greater rate of displacement or flexing, and therefore greater force and/or energy storage, as the cam 216 rotates in response to the user bending over. For example, the eccentric shape and the variation in radius $R_2$ can be configured so that the stored force and/or energy increases substantially sinusoidally until the angle of rotation reaches approximately 90 degrees and so as to vary linearly (with a relatively small slope) after 90 degrees of rotation.

Figure 5:
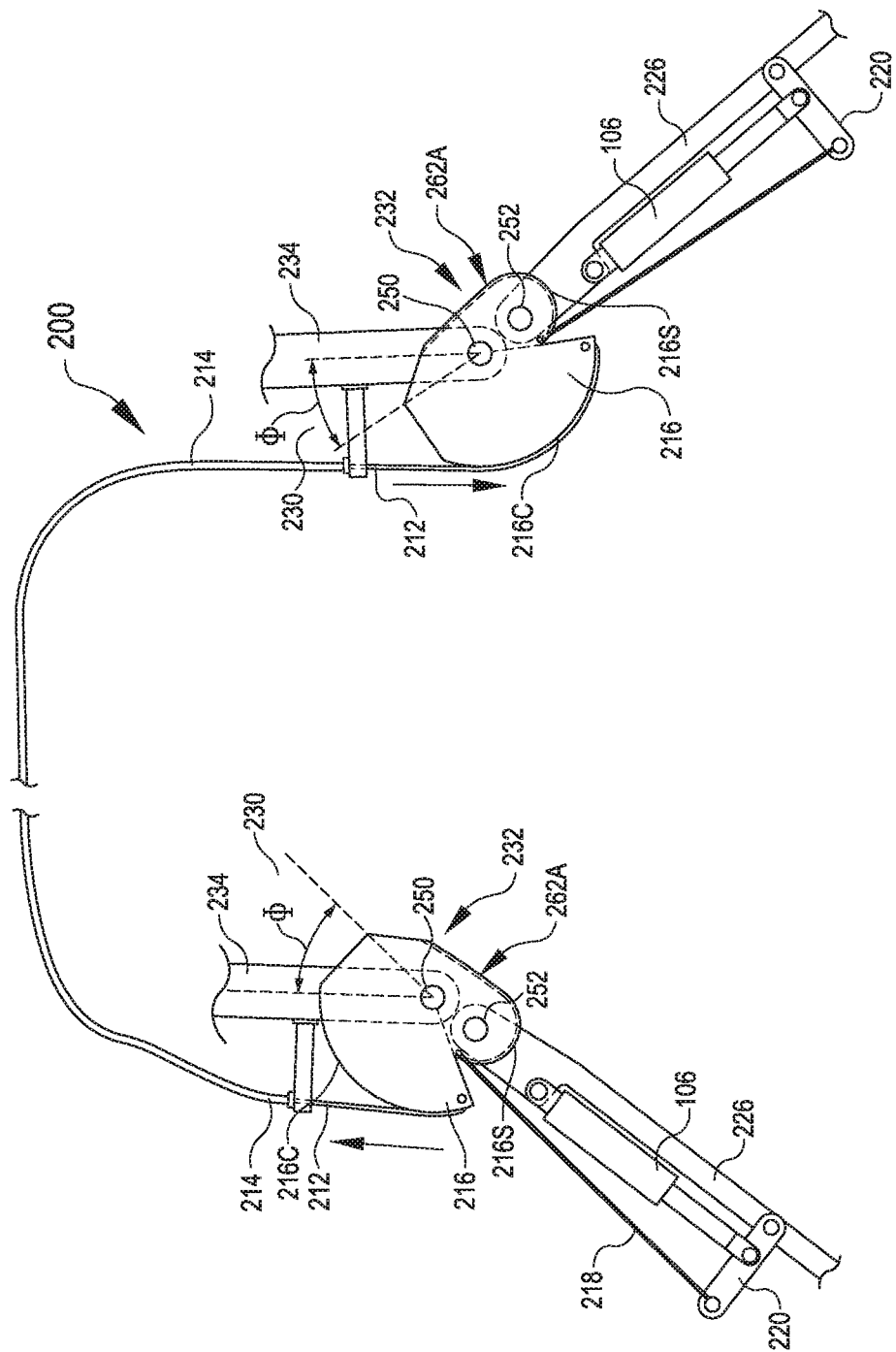
FIG. 5 depicts an illustration of a leg differential system for an exoskeleton showing left and right leg assemblies connected by a differential cable, according to at least one example.

FIG. 5 illustrates a leg assembly 200, as shown and described in FIG. 3, for both the right leg and the left leg, connected by the cable 212. These elements correspond to left leg assembly 3, right leg assembly 4, differential cable 5, and force device 7 of FIG. 1. Alternatively, force release 6 may be included in some examples. FIG. 5 shows an example of how the cable 212 and the cams 216 allow a user 102 of the exoskeleton system 100 to walk without loading the force devices 106 of the leg assemblies. For each leg, the hip strut 234 and leg strut 226 are joined by a cam 216 at pivot pin 250 and pivot pin 252, respectively. The cable 212 connecting the leg assembly 200 for the right leg to the leg assembly 200 for the left leg allows the hip joint 232 of each leg assembly to be rotated at an equal angle 230 and/or equivalent amount but in opposite directions without storing energy in the force devices 106 of the exoskeleton system 100. As the cam 216 of the leg assembly 200 for the left leg rotates clockwise, thereby shortening the portion of cable 212 that extends out of the sheath 214 at the left side, the cam 216 of the leg assembly 200 for the right leg will rotate in a counter-clockwise direction (as viewed from the same direction as the leg assembly 200 for the left leg), thereby increasing the portion of the cable 212 that extends out of the sheath 214 on the right side. The combination of the cable 212 and sheath 214 allows a user to walk without loading the force device 106 and may also accommodate situations where the user's legs are used unevenly. For example, in some instances, the user may bend the left or right leg more than the other and the cable 212 ensures that the exoskeleton system 100 evenly stores and/or releases energy evenly.

The cable 212 connects a cam 216 of the left leg assembly to a cam 216 of the right leg assembly. The cable 212 is a rigid cable such as the inner portion of a Bowden cable. The rigidity of the cable 212 allows the left leg assembly and the right leg assembly to move in alternate directions. When the left leg advances, such as during walking, the right leg will be rotated with respect to the pivot pin 252 in an opposite direction. When the rotation of the cams 216 about pivot pins 252 on both the left leg assembly and the right leg assembly are in the same direction, as would occur when a user bends over, then the cable 212 ensures that each force device 206 on each leg assembly 200 is loaded evenly.

Figure 6:
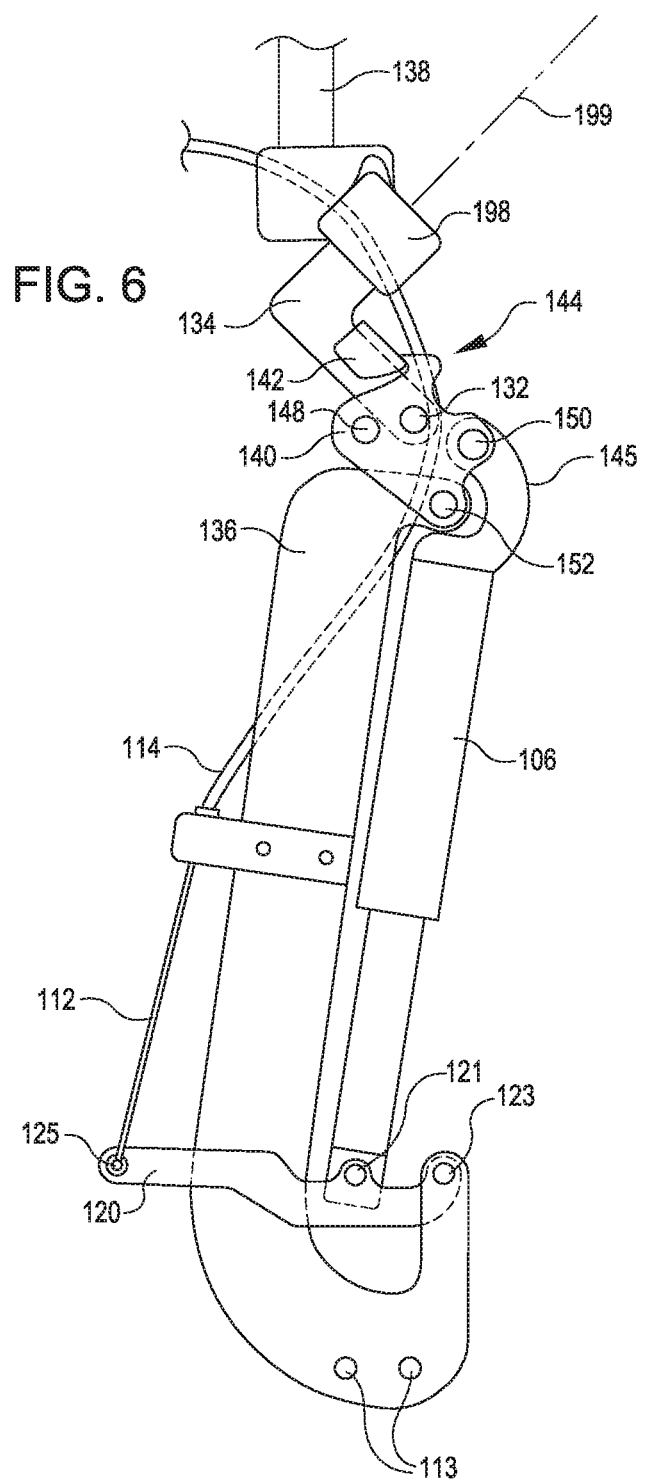
FIG. 6 is a side view of the leg assembly portion of the exoskeleton of FIG. 2 including a leg differential system, according to at least one example.

FIG. 6 shows the leg assembly of FIG. 2 and an alternative that may be implemented in place of the assemblies shown in FIGS. 3 through 5. The leg assembly may be incorporated as a left leg assembly 3 and/or a right leg assembly 4 of an exoskeleton system 100 as shown in FIG. 1. The leg assemblies are equipped with a differential cable 112 and a sheath 114 to facilitate differential leg placement and/or differential hip rotation such as during walking. The leg assembly shows the differential cable 112 connected directly to a rocker bar 120 rather than to a cam as shown in previous examples.

FIG. 6 also shows a release mechanism 144, one version of a force release 6, positioned near or at the hip joint 152. The release mechanism 144 may be incorporated into the hip joint 152 or may be near the hip joint 152 in other examples. In some further examples, the release mechanism 144 may be distant from the hip joint 152. The details of the release mechanism 144 are shown and described with respect to FIG. 11 below.

Figure 7:
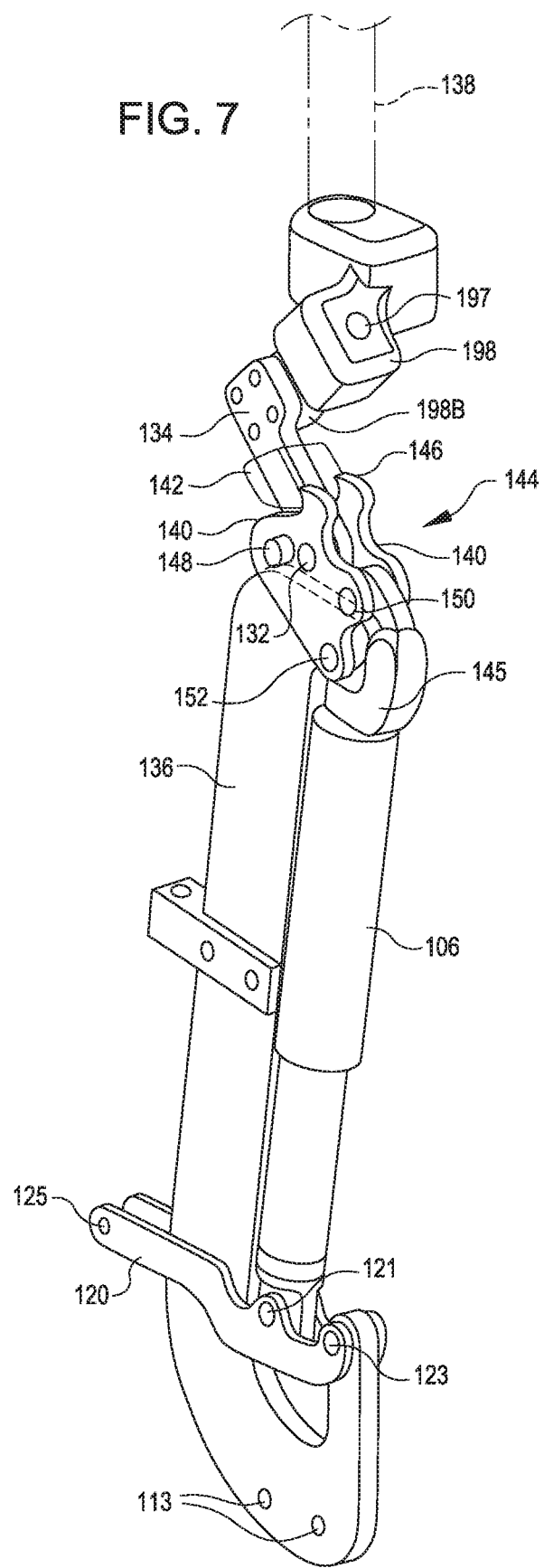
FIG. 7 is a perspective view of the leg assembly portion of FIG. 6, according to at least one example.

FIG. 7 depicts a perspective view of the leg assembly portion of FIG. 6, according to at least one example. As shown in FIG. 7, the release mechanism 144 includes two plates 140 which are coupled together at the hip joint 152 and connection point 150, in addition to at pivot point 132. At connection point 150, the lever arm 145 of the force device 106 is coupled to the plates 140 of the release mechanism 144. Stop 148 prevents over-rotation of the release mechanism 144 by contacting hip strut 134 at one extreme and leg strut 136 at the other. The hooks 146 of the plates 140 contact the catch 142 when engaged to provide force as described below with respect to FIG. 11 below. The plates 140 are located on opposite sides of the lever arm 145 of force device 106 as well as opposite sides of the leg strut 136 and the hip strut 134. By having these components sandwiched between the plates 140, each of the joints such as the connection point 150, hip joint 152, and pivot point 132 act as pins in shear with the elements of the assembly and prevent excessive torques from being applied to elements of the assembly, thereby protecting those elements from fatigue and damage.

Lateral joint 198 is shown with a pivot pin 197 through which axis 199 (shown in FIG. 6) extends. A connection block 198B is connected to the pivot pin 197 and can rotate with the pivot pin 197 about axis 199. The hip strut 134 is connected to the connection block 198B so as to rotate with the connection block 198B and pivot pin 197. This pivoting or rotational interconnection of the hip strut 134 to the lateral joint 198 facilitates lateral pivoting of the leg assembly either during use of the exoskeleton system 100 or while donning or removing the system 100 as described above. Other elements of the leg assembly are shown as described with respect to FIG. 6.

Figure 8:
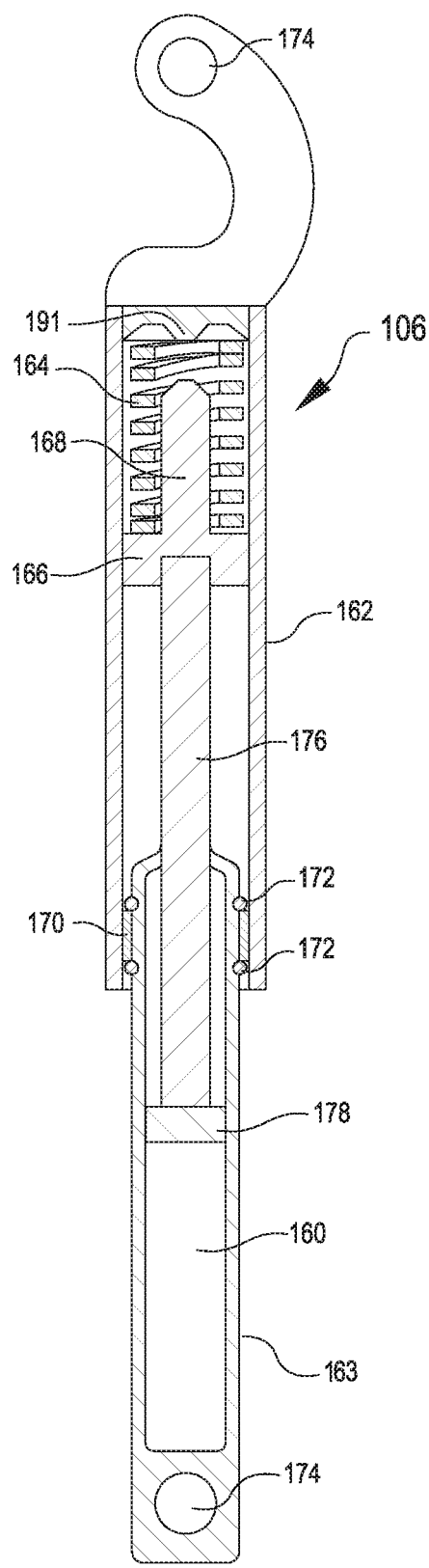
FIG. 8 is a cutaway view of a force device for use in an exoskeleton, according to at least one example.

FIG. 8 shows a force device 106 for use in an embodiment of exoskeleton system 100 as described herein, according to at least one example. The force device 106 may be part of a left leg assembly 3 and/or a right leg assembly 4 in exoskeleton system 100 of FIG. 1. The force device 106 in this example stores energy upon compression. The force device 106 combines a compression spring 164 and a gas spring 160 to provide a smooth force profile that begins at zero force at an initial position. Typically, gas springs 160 provide a high initial force while compression springs 164 have low displacements and are therefore not well-suited to provide force for a large range of motion such as bending at the hip. The arrangement shown in FIG. 8 combines the benefits of both the gas spring 160 and the compression spring 164 to provide a force device 106 with zero initial force and/or pre-loading, but provides a smooth force profile which increases with displacement of the force device 106.

Each end of the force device 106 has attachment points 174 for connecting to components of a leg assembly, such as tension cables, bars, hip joints, and/or leg struts. The outside of the force device 106 includes an alignment tube 162 for keeping the components of the force device 106 in alignment and coaxial. The alignment tube 162 has a cylindrical and/or tubular body. Within the alignment tube 162 are a compression spring 164 and a portion of the gas spring 160 for storing energy as described above. The gas spring 160 has a piston rod 176 and a cylinder 163, as well as a piston head 178 and release and/or fluid communication valves (not shown). The fluid communication valves may include a release valve (not shown) for opening the chamber of the gas spring 160 to fluid communication with the surrounding environment, allowing free movement of the gas spring 160 without producing any force and/or storing energy and/or releasing force from the gas spring 160. The piston rod 176 of the gas spring 160 couples to a slider 166 that contacts the alignment tube 162 to keep the piston rod 176 of the gas spring 160 centralized within the alignment tube 162. The slider 166 may be formed of polytetrafluoroethene ("PTFE") (e.g., Teflon-branded PTFE) or any other low-friction material, or may be formed of steel or aluminum and lubricated with respect to alignment tube 162. The slider 166 couples to or contacts the compression spring 164 on a side opposite the gas spring 160. The slider 166 may include a travel limiter 168 to limit and/or set a compression limit on the compression spring 164, beyond which the compression spring 164 cannot be compressed, due to inelastic deformation as a result of over-compression. The slider 166 and the travel limiter 168 are coupled to the end of the piston rod 176 and bottom out or contact the end 191 of the alignment tube 162 when the force device 106 is compressed to its travel limit. When the travel limiter 168 contacts the end 191, the force device 106 is no longer able to compress any further and thereby protects the compression spring 164 from deformation. In some examples, the slider 166 and the travel limiter 168 may be formed of a single piece, and may be PTFE (e.g., Teflon-branded PTFE) and/or some other low-friction material, or a combination of materials, for example PTFE (e.g., Teflon-branded PTFE) for the slider 166 and a rubber for the travel limiter 168.

The compression spring 164 and the gas spring 160 each change length as the compression spring 164 is compressed and the piston head 178 moves within the cylinder 180 as the gas spring 160 compresses. The cylinder 163 of the gas spring 160 moves relative to the alignment tube 162 during compression. To allow relative movement of the gas spring 160 within the alignment tube 162, the inside of the alignment tube 162 includes a bushing 170 and two retaining rings 172 to hold the bushing 170 in place. The bushing 170 contacts the inside of the alignment tube 162 and the outside of the cylinder 163. When the gas spring 160 and compression spring 164 are fully extended, and/or in a relaxed state without any stored energy therein, the bushing 170 maintains contact with the cylinder 163 of the gas spring 160. The gas spring 160 and alignment tube 162 are sufficiently long to store energy as the exoskeleton system 100 moves but not long enough for the cylinder 163 of the gas spring 160 to slide beyond the bushing 170, potentially misaligning the gas spring 160 and alignment tube 162.

In some embodiments, force device 106 may include a compression spring 164 and gas spring 160 arranged in parallel, with one end of each of the gas spring 160 and compression spring 164 connected to a first end of the alignment tube 162 and an opposite end of the gas spring 160 and compression spring 164 connected to a second end of the alignment tube 162. In this configuration, the gas spring 160 and compression spring 164 are loaded simultaneously based on the same displacement. For example, at a given level of compression, the compression spring 164 and gas spring 160 will each have identical compression distances, resulting in different energy storage and/or force required to compress each. This differs from the arrangement in series described above, where the compression spring 164 and gas spring 160 may not have equal displacement or compression distances, and instead may load preferentially. Examples of the force device 106 can be configured so that the exoskeleton system, when engaged to provide lift-assistive force, exerts an assistive-to-lifting (or straightening back up) hip moment (when a user bends over with both legs at the same angle with respect to the torso) that varies sinusoidally from zero to a sinusoidal peak of between 15 Nm and 60 Nm (or alternatively, a peak of between 20 Nm and 25 Nm—one example being about 22 Nm) over a range of leg-to-torso angles of the user from about 180 degrees (standing straight up) to about 90 degrees (bent forward). The hip moment then begins to fall off slowly from the peak at an increasing rate for about 20 to 40 additional degrees (as the torso moves closer to the legs), at which point the decrease in hip moment becomes more linear until a minimum leg-to-torso angle of about 30 degrees (where the hip moment can be less than 10 Nm, or between 5 Nm and 10 Nm).

Figure 9A:
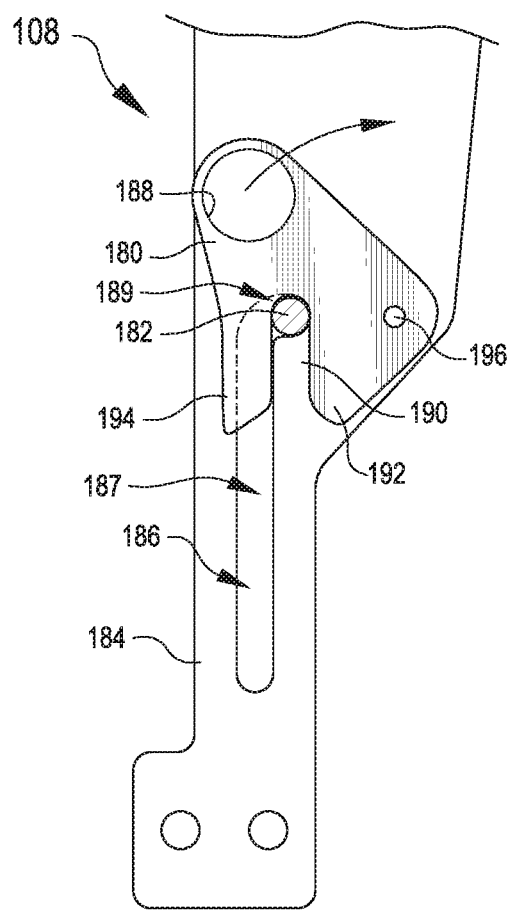
FIG. 9A is a partial cutaway, side view of a release mechanism for a force device of an exoskeleton in an engaged position, according to at least one example.
Figure 9B:
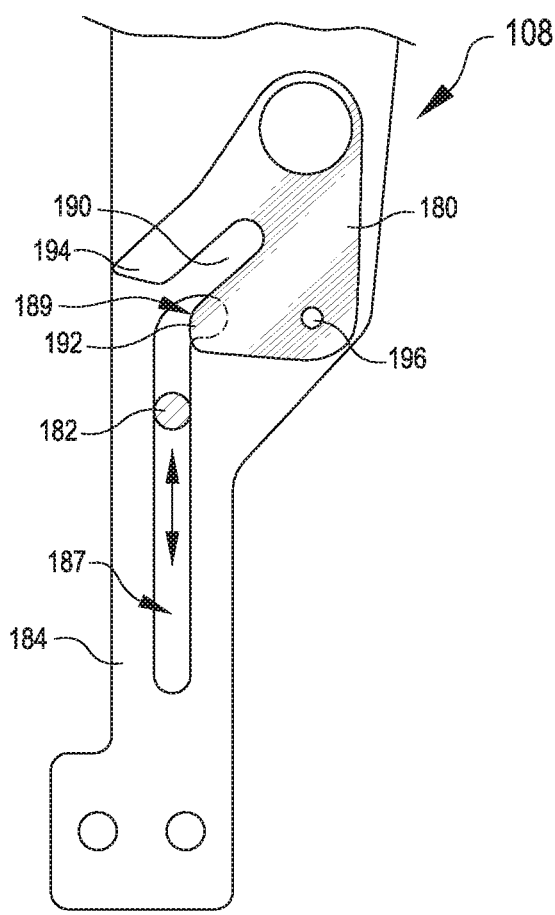
FIG. 9B depicts the release mechanism of FIG. 9A in a released position.

FIGS. 9A and 9B illustrate two stages of a release mechanism 108 configured to release one end of the force device 106 and allow free movement of the exoskeleton system 100. Release mechanism 108 is one example of a force release 6 which may be incorporated in some examples of exoskeleton system 100. FIG. 9A shows the release mechanism 108 in a secured configuration while FIG. 9B shows the release mechanism 108 in a free configuration.

The release mechanism 108 is designed to allow a user 102 to disengage the force device 106 of an embodiment of an exoskeleton system 100 and thereby sit, bend, or move without activating the lift-assistive forces otherwise provided by the force devices 106 of the exoskeleton system 100. This may, for example, be for when a user 102 is taking a break and wishes to sit and/or is switching from working on their feet to operating machinery such as a forklift when a user 102 may sit to operate. The ability to disengage the force of the exoskeleton system 100 allows the user 102 to easily make such a transition without removing and/or re-fitting the exoskeleton system 100 each time.

In FIG. 9A, a portion of the leg strut 184 is shown including the release mechanism 108. The release mechanism 108 includes several different components such as a latch 180, pin 182, and channel 186 in the leg strut 184. The channel 186 includes a first portion 187 oriented longitudinally along the length of the leg strut 184 and a secured portion 189 oriented so as to extend laterally across a portion of the leg strut 184 (e.g., perpendicular to the first portion 187). In some examples, the secured portion 189 may be at an angle other than perpendicular to the first portion 187, in any case, the secured portion 189 may be oriented relative to the first portion 187 such that the pin 182 may be held in place when it is located in the secured portion 189 the latch 180 remains in the origination shown in FIG. 9A, but may move freely in the first portion 187 when the latch 180 is oriented as shown in FIG. 9B. The latch 180 has a finger loop 188 for use by the user 102 to rotate the latch 180 to release the release mechanism 108. The finger loop 188 may be substituted by (or equipped with) any user interface and/or user engagement portion configured to allow the user 102 to move and/or interact with the latch 180. The latch 180 has a pivot 196 around which it rotates to release the pin 182. The pin 182 secures to one end of the force device 106 such that when the pin 182 is secured in the portion 189 by the latch 180, the force device 106 can be used to store and release energy to assist the user 102 of the exoskeleton system 100. The latch 180 may have a torsion spring and/or other similar device, such as a ball detent, to maintain the latch in a position the user 102 moves it to.

The latch 180 has a cover 192 and a guide 194 which (depending on the orientation/manipulation of the latch 180) can serve to retain, release, or return the pin 182 to different positions within the release mechanism 108. In the position shown in FIG. 9A, the latch 180, and more specifically the guide 194, latch channel 190, and cover 192 keep the pin 182 retained in the locked or secured portion 189 of the channel 186. The latch 180 and the components described above, define a slot to capture the pin 182 and/or are configured to guide the pin 182 connected to the force device 106 into various positions. In this position, the pin 182 is fixed and therefore keeps the end of the force device operatively engaged to the leg strut 184 so that as the hip strut (e.g., 134 or 234) rotate relative to the leg struts (136, 236 or 184) in the same relative direction the force device 106 will store or release energy.

FIG. 9B shows the leg strut 184 and latch 180 shown in FIG. 9A, but portrays the latch 180 in a released position so the pin 182 is free to move along the channel 186. The latch 180 can be rotated by the user 102 around the pivot 196 and may include one or more detents and/or stops to releasably secure the latch 180 in the configuration shown in FIG. 9A and/or FIG. 9B. As shown in 9B, the cover 192 of the latch 180 protects or covers the horizontal portion of the channel 186 such that the pin 182 cannot move into the secure position as shown in FIG. 9A. The latch 180 may include a travel limiter such as a bumper or pin to limit or restrict rotation of the latch 180 to a certain range.

When the latch 180 has been released, as shown in FIG. 9B, the pin 182 is free to move along the channel 186 but will not be able to move back into the secured position of FIG. 9A until the latch 180 is rotated back in position. FIGS. 10A through 10D show the use of the release mechanism 108 to operatively disengage the force device 106. When the user 102 wishes to engage the force device 106 again after it has been operatively disengaged, the user 102 can straighten up while wearing the exoskeleton system 100, and as a result, the pin 182 ascends in the channel 186 and contacts the guide 194. The guide 194 will move the latch 180, when contacted by the pin 182, just enough to allow the pin 182 to return to the secured portion or laterally extending portion 189 of the channel 186.

The portion of exoskeleton system 100 shown in FIGS. 10A-10D may correspond to a left leg assembly 3 of exoskeleton 100 as described in FIG. 1. Beginning with FIG. 10A, the release mechanism 108 is shown in a similar orientation to that shown and described in FIG. 9A, with the pin 182 secured to operatively engage the end of the force device 106 to the leg strut 184.

Figure 10B:
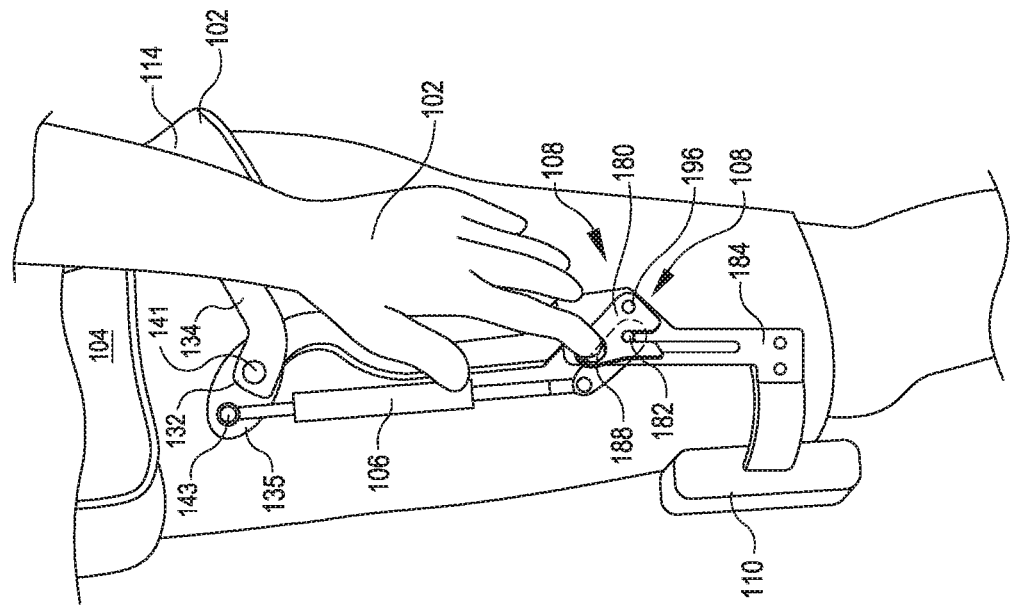
FIGS. 10A-10D depict stages of use of the release mechanism of FIG. 9 by a user of an exoskeleton, according to at least one example.
Figure 10A:
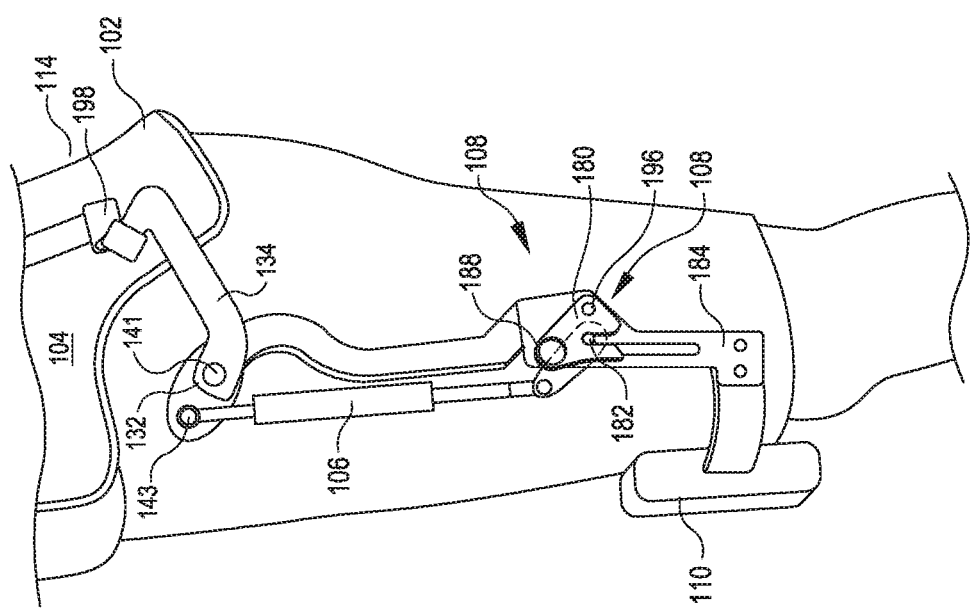
Figure 10D:
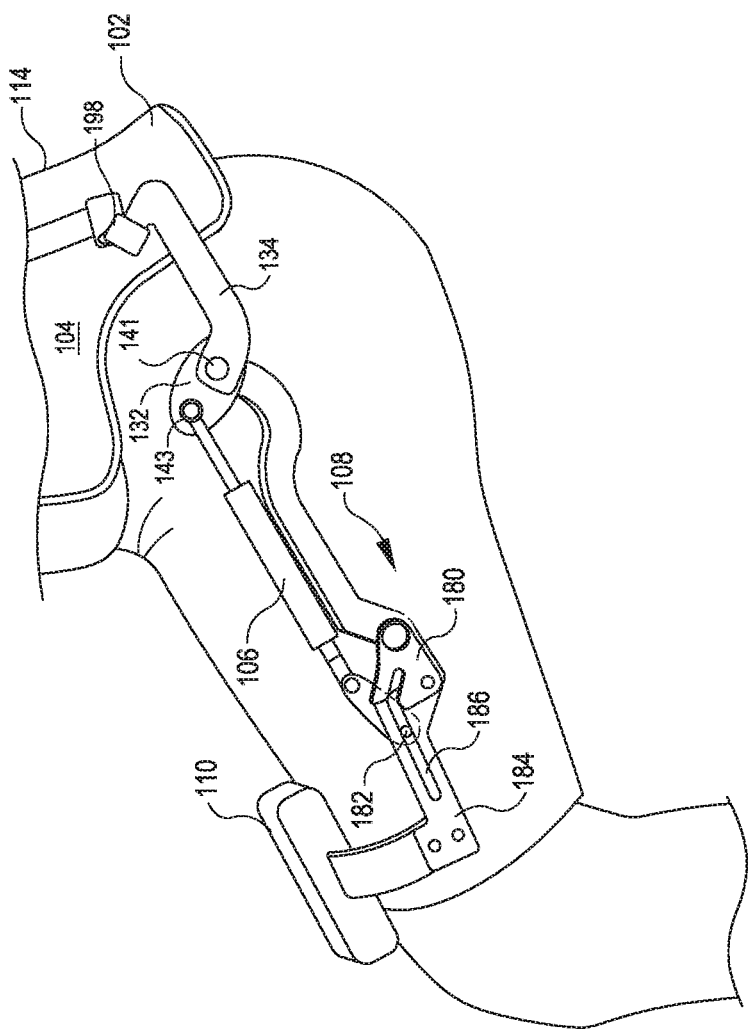

In FIG. 10B, the user 102 places a finger in the finger loop 188 of the latch 180 to prepare for rotating the latch 180 to operatively disengage the force device 106 and allow rotation of the hip struts (e.g., 134 or 234) relative to the leg struts (136, 236 or 184) in the same relative direction without storing or releasing energy from the force devices 106 (i.e., without invoking the lift assistance that the exoskeleton system 100 might otherwise provide). Next, in FIG. 10C, the user 102 rotates the latch 180, shown rotating in a clockwise direction, to move the pin 182 from the secure position of the channel 186 to the vertical portion where the pin 182 is free to move vertically. With the pin 182 free to move, the force device 106 is now has an end slidably connected to the leg strut 184. As the user 102 moves, bends, sits, and/or rotates at the hip joint, the pin 182 will move freely along the channel 186, as shown in FIG. 10D.

Figure 10C:
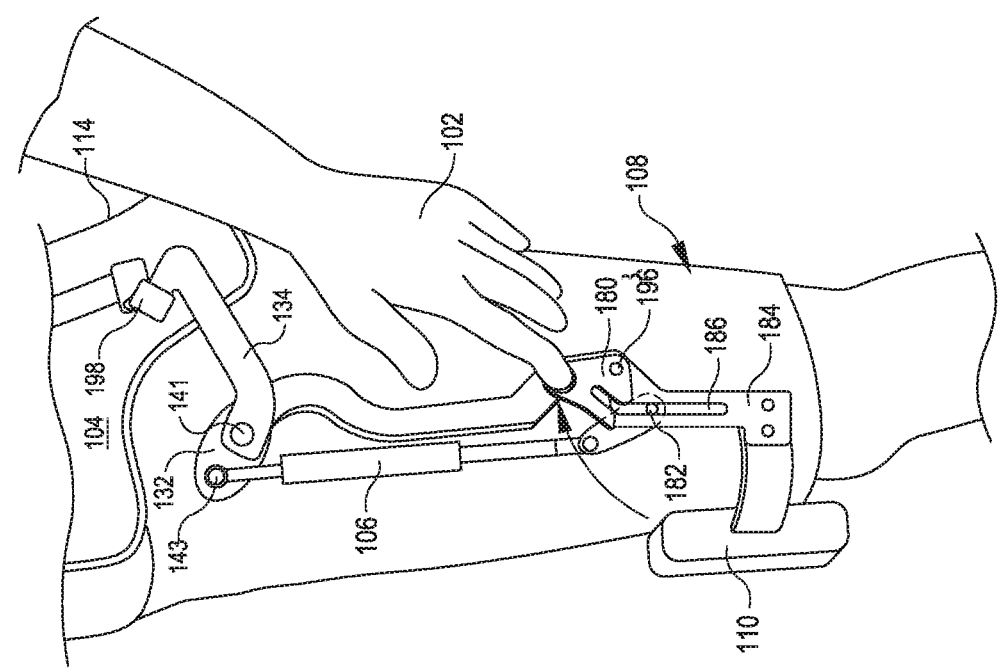

To return the release mechanism 108 to the engaged position, the user 102 rotates the latch 180 in a direction opposite the rotation shown in FIG. 10C. In this example the latch 180 would rotate counter-clockwise to re-engage. The pin 182 may still be in a lower portion of the channel 186 when the latch 180 is rotated as previously described, and therefore the pin 182 will not yet be secured. To return the pin 182 to the secured position, the user 102 returns to a fully upright position and/or moves the leg to behind an axis defined by the upper body of the user 102. In other words, the user 102 bends slightly backwards at his or her hips such that the legs of the user 102 are slightly behind the upper body of the user 102. This positioning of the legs causes the pins 182 (on each side of the user) to return to the upper portion of the channel 186, and the guide 194 of the latch 180 guides the pin 182 into the laterally extending portion 189 of the channel 186 without any additional action by the user 102.

In some examples, the latch 180 is configured to have a single-unlocked position, a locked position, and an unlocked position. In the locked position, the pin 182 is held in place and/or retained by the latch 180. In the unlocked position, the pin 182 is free to move along the channel 186. In the single-unlocked position, the latch is not rotated to the unlocked position, but only rotates enough to allow the pin 182 to move into the channel 186, whereon the latch 180 is designed to capture and/or retain the pin 182 when the pin 182 moves vertically in the channel 186 and contacts the latch 180. In other words, the latch 180 releases the pin 182, but when the pin 182 contacts the guide section of the latch 180, the pin 182 will return to the laterally extending portion 189 of the channel 186. In the single-unlock position, the latch 180 automatically re-engages when the pin 182 moves to the upper portion of the channel 186.

FIG. 11 illustrates a detail view of the release mechanism 144 shown in FIGS. 2, 6, and 7 to allow free movement of the user 102 while wearing an embodiment of exoskeleton system 100 without storing and/or releasing energy at the force device 106. This may be implemented as force release 6 in exoskeleton system 100 as described above. For example, a user 102 may wish to sit down for a break or at a machine such as a forklift and while seated does not wish to have the exoskeleton system 100 providing force to stand from the seated position. The release mechanism 144 shown in FIG. 11 is illustrated as part of the leg system in FIG. 6. In this example, the release mechanism 144 is shown in solid and dashed lines, indicating an engage (solid) position and disengage (dashed) position.

The release mechanism 144 includes a plate 140 which rotates around a pivot point 132. In some examples, pivot point 132 may be near or co-located with hip joint 152. The plate 140 can rotate in either direction denoted by arrow 153. There is also a catch 142 which is configured to slide along a strut (e.g., hip strut 134 or 234) in either direction denoted by direction 143. The force device 106 has an upper end connected to the plate 140 and rather than having a movable and/or releasable connection point as described with respect to the example shown in FIGS. 9A-10D, the plate 140 rotates freely when the release mechanism 144 is in the disengaged position, allowing rotation of the user's legs in the same direction relative to the user's upper body without storing and/or releasing energy in the force device 106 and without invoking the lift-assistive forces of the exoskeleton system 100.

In the engage position, shown in solid lines in FIG. 11, the plate 140, which includes a hook 146 is in contact with the catch 142. The catch 142 is translated along direction 143 towards the hip joint 152 (shown in FIG. 2) and towards pivot point 132. The catch 142 may have a detent or other retaining device to releasably secure it in the engage position, any suitable securing device may be substituted for the detent. With the hook 146 of the plate 140 in contact with the catch 142, the plate 140 rotates as the hip strut 134 or 234 of the exoskeleton system 100 rotates, thereby moving the end of the force device 106 connected to the plate 140 to store and/or release energy.

In the disengage position, shown in dashed lines in FIG. 11, the plate 140 is free to rotate around the pivot point 132 without contacting the catch 142. The catch 142 is moved, along direction 143, away from the pivot point 132 to a location where the hook 146 of the plate 140 will not contact the catch 142 as the plate 140 rotates with bending or rotation of the user 102. As with the engage location, the disengage position of the catch 142 may be secured with a detent to prevent undesired movement of the catch 142. Additionally, if the catch 142 is not slid all the way to the detent while disengaged, the catch 142 may be spring-loaded towards plate 140 so that it automatically re-engages if the plate 140 rotates counter-clockwise in FIG. 11 so that the hook 146 is past the catch 142. This will occur if the user stands up straight again after being in a bent position, for example while seated.

When a user 102 disengages or releases the force device 106 using the release mechanism 144, they pull and/or move the catch 142 to the disengage position. The user 102 is then free to sit, stand, bend, or perform any action while wearing the exoskeleton system 100 without operatively engaging the force device 106 and without invoking the lift-assistive forces of the exoskeleton system 100. To return the release mechanism 144 to the engage position, the user 102 stands in an upright position which will cause the plate 140 to rotate such that the hook 146 is positioned to contact and/or be positioned above the catch 142. The user 102 then slides the catch 142 towards the pivot point 132. The hook 146 will then contact the catch 142 as rotation of the plate 140 occurs about the pivot point 132, engaging the force device 106 for use with the exoskeleton system 100.

Figure 12:
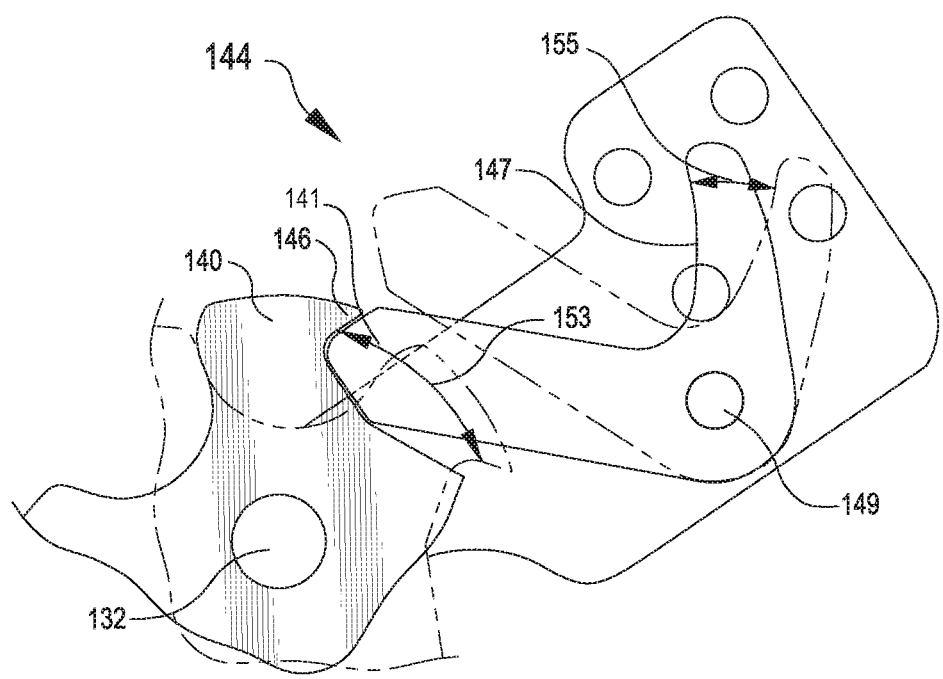
FIG. 12 depicts a detail view of another example of the release mechanism of FIG. 6 in both an engaged and a released position, according to at least one example.

FIG. 12 illustrates a detail view of another example of the release mechanism 144 shown in FIGS. 2, 6, and 7 to allow free movement of the user 102 while wearing an embodiment of exoskeleton system 100 without storing and/or releasing energy at the force device 106.

The release mechanism 144 includes a plate 140 which rotates around a pivot point 132. The plate 140 can rotate in either direction denoted by arrow 153. There is also a latch 141 which rotates around a pivot 149 in either direction denoted by arrow 155. The force device 106 has an upper end connected to the plate 140 and rather than having a movable and/or releasable connection point as described with respect to the example shown in FIGS. 9A-10D, the plate 140 rotates freely when the release mechanism 144 is in the disengaged position, allowing rotation of the user's legs in the same direction relative to the user's upper body without storing and/or releasing energy in the force device 106 and without invoking the lift-assistive forces of the exoskeleton system 100.

In the engage position, shown in solid lines in FIG. 12, the plate 140, which includes a hook 146 is in contact with the latch 141. The latch 141 is rotated downward towards pivot point 132. The latch 141 may have a detent or other retaining device to releasably secure it in the engage position; any suitable securing device may be substituted for the detent. With the hook 146 of the plate 140 in contact with the latch 141, the plate 140 rotates as the hip strut 134 or 234 of the exoskeleton system 100 rotates, thereby moving the end of the force device 106 connected to the plate 140 to store and/or release energy.

In the disengage position, shown in dashed lines in FIG. 12, the plate 140 is free to rotate around the pivot point 132 without contacting the latch 141. The latch 141 is rotated clockwise in FIG. 12, away from the pivot point 132 to a location where the hook 146 of the plate 140 will not contact the latch 141 as the plate 140 rotates with bending or rotation of the user 102. As with the engage location, the disengage position of the latch 141 may be secured with a detent, magnet, or other mechanism to prevent undesired movement of the latch 141. If the latch 141 is disengaged, a spring may provide a bias torque on it, pushing it towards plate 140. Thus, if it is not secured by a detent or other mechanism, it will automatically re-engage if plate 140 rotates counterclockwise enough that the end of the latch 141 can rotate past hook 146. This may occur if the user 102 stands up to a vertical position with their thighs in line with their torso.

When a user 102 disengages or releases the force device 106 using the release mechanism 144, they pull and/or move the thumb lever 147 on latch 141 to the disengage position. The user 102 is then free to sit, stand, bend, or perform any action while wearing the exoskeleton system 100 without operatively engaging the force device 106 and without invoking the lift-assistive forces of the exoskeleton system 100. To return the release mechanism 144 to the engage position, the user 102 stands in an upright position which will cause the plate 140 to rotate such that the hook 146 is positioned to contact and/or be positioned past the latch 141. The user 102 then can rotate the latch 141 or thumb lever 147 towards the pivot point 132. Alternatively, the user 102 can release the latch 141 from the detent and then a spring force can cause the latch 141 to rotate toward the pivot point 132. The hook 146 will then contact the latch 141 as rotation of the plate 140 occurs about the pivot point 132, engaging the force device 106 for use with the exoskeleton system 100.

FIG. 13 depicts a thigh pad 110, according to at least one example. The thigh pad 110 is a single piece, though it maybe comprised of multiple components in other examples. The thigh pad 110 connects to the leg strut 136 at connections 113 through rivets, bolts, or other attachment means. A curved extension 127 transitions between the connections 113 and the thigh support area including bar 119, distal web support 117, and proximal web support 115. The thigh pad 110 is formed of metal, such as aluminum, though as with other components of the exoskeleton system 100, may also be formed of composites, carbon fiber, polymers, or other rigid materials.

In the example shown in FIG. 13, a webbing, textile, or mesh (not shown) may be suspended between the distal web support 117 and the proximal web support 115. The webbing may be stretched tightly between the supports to provide a cushion against which the thigh of the user 102 contacts. The use of webbing precludes the use of cushions such as foam pads and increases air circulation to reduce sweating at the contact point. In other examples, the thigh pad structure may include cushions such as foam or rubber to provide a thigh interface which is comfortable and distributes the force of the exoskeleton system 100 over a larger area of the user's leg.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Variations of examples described herein may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A lift assist exoskeleton, comprising:
a harness assembly configured for mounting to a torso of a user;
a right-side leg assembly comprising a right-side leg strut, a right-side energy storage device, and a right-leg interface feature, the right-side leg strut and the right-side energy storage device being coupled with respect to the harness assembly through a right-side pivotal coupling comprising a right-side pivotal offset, the right-side energy storage device being configured to store a right-side assistive force to assist straightening of a right leg of the user toward alignment with the torso of the user;
a left-side leg assembly comprising a left-side leg strut, a left-side energy storage device, and a left-leg interface feature, the left-side leg strut and the left-side energy storage device being coupled with respect to the harness assembly through a left-side pivotal coupling comprising a left-side pivotal offset, the left-side energy storage device being configured to store a left-side assistive force to assist straightening of a left leg of the user toward alignment with the torso of the user; and
a cable assembly coupling the right-side energy storage device with the left-side energy storage device.

2. The lift assist exoskeleton of claim 1, further comprising:
a right-side cam member pivotally mounted to the harness assembly via a right-side pivot feature; and
a left-side cam member pivotally mounted to the harness assembly via a left-side pivot feature.

3. The lift assist exoskeleton of claim 2, wherein:
the right-side energy storage device is pivotally attached between a right-side rocker bar and a right-side lever arm;
the left-side energy storage device is pivotally attached between a left-side rocker bar and a left-side lever arm;
the right-side rocker bar is pivotally attached at one end to the right-side leg strut; and
the left-side rocker bar is pivotally attached at one end to the left-side leg strut.

4. The lift assist exoskeleton of claim 3, wherein:
the right-side energy storage device stores energy in response to axial compression of the right-side energy storage device; and
the left-side energy storage device stores energy in response to axial compression of the left-side energy storage device.

5. The lift assist exoskeleton of claim 3, further comprising:
a right-side hip strut, the right-side hip strut comprising a right-side joint that couples the harness assembly to the right-side leg assembly through a right-side pivot axis, the right-side pivot axis extending between 30 to 60 degrees as compared to a vertical axis of a user; and
a left-side hip strut, the left-side hip strut comprising a left-side joint that couples the harness assembly to the left-side leg assembly through a left-side pivot axis, the left-side pivot axis extending between 30 to 60 degrees as compared to the vertical axis of the user.

6. The lift assist exoskeleton of claim 2, wherein:
the right-side cam member comprises a curved perimeter surface configured to accommodate variable engagement with a cable produced by rotation of the right-side cam member relative to the harness assembly; and
the left-side cam member comprises a curved perimeter surface configured to accommodate variable engagement with the cable produced by rotation of the left-side cam member relative to the harness assembly.

7. The lift assist exoskeleton of claim 2, wherein:
the cable assembly comprises an outer conduit and a cable that extends through a lumen of the outer conduit, the outer conduit being attached to each of the right-side leg strut and the left-side leg strut;
the right-side leg strut is pivotally attached to the right-side cam member; and
the left-side leg strut is pivotally attached to the left-side cam member.

8. The lift assist exoskeleton of claim 7, wherein:
the right-side energy storage device is pivotally attached to the right-side cam member; and
the left-side energy storage device is pivotally attached to the left-side cam member.

9. The lift assist exoskeleton of claim 2, wherein the cable assembly comprises an outer conduit and a cable that extends through a lumen of the outer conduit, the outer conduit being attached to each of the right-side leg strut and the left-side leg strut.

10. The lift assist exoskeleton of claim 9, wherein:
the right-side leg strut is pivotally attached to the right-side cam member; and
the left-side leg strut is pivotally attached to the left-side cam member.

11. The lift assist exoskeleton of claim 1, wherein:
the cable assembly couples the right-side leg strut and a right-side rocker bar of the right-side leg assembly with the left-side leg strut and a left-side rocker bar of the left-side leg assembly; and
the cable assembly comprises an outer conduit and a cable that extends through a lumen of the outer conduit.

12. A lift assist exoskeleton, comprising:
a harness assembly configured for mounting to a torso of a user; and a leg assembly comprising a leg strut, an energy storage device, a leg interface feature, and a release mechanism, the leg strut and the energy storage device being pivotally coupled with respect to the harness assembly through a pivotal coupling comprising a pivotal offset, the energy storage device being configured to store an assistive force to assist straightening of a leg of the user toward alignment with the torso of the user when the release mechanism is in an engage position, the release mechanism being operable by the user to move from the engage position to a disengage position so as to mechanically disengage the energy storage device while the release mechanism remains in the disengage position.

13. The lift assist exoskeleton of claim 12, wherein the release mechanism comprises:
a channel along a length of the leg strut to which one end of the energy storage device is slidably coupled, the channel having a longitudinal portion extending longitudinally along the leg strut and a lateral portion extending laterally from the longitudinal portion; and
a latch configured to be movable to and from first and second latch positions or orientations, wherein placement of the latch into the first latch position or orientation operatively places the release mechanism in the engage position by keeping the one end of the energy storage device coupled to the lateral portion of the channel, and wherein placement of the latch into the second latch position or orientation operatively places the release mechanism in the disengage position by allowing the one end of the energy storage device to move along the longitudinal portion of the channel.

14. The lift assist exoskeleton of claim 13, wherein the latch of the release mechanism is selectively movable among:
an engaged position wherein the end of the energy storage device is kept coupled to the lateral portion of the channel;
a single-unlocked position wherein the end of the energy storage device is in the longitudinal portion of the channel and re-engages the latch when the end of the energy storage device approaches the lateral portion of the channel; and
an unlocked position wherein the lateral portion of the channel is blocked by the latch and the end of the energy storage device is free to move along the longitudinal portion of the channel.

15. The lift assist exoskeleton of claim 13, wherein the latch defines a slot configured to interface with the end of the energy storage device, the latch having: a retaining section configured to retain the end of the energy storage device in the lateral portion of the channel when the release mechanism is in the engage position; a guide section in a middle portion of the slot configured to guide the end of the energy storage device from the longitudinal portion of the channel into the lateral portion of the channel; and an entry at an edge of the latch configured to move the latch when the end of the energy storage device contacts the latch to allow the latch to automatically re-engage the retaining section with the end of the energy storage device.

16. The lift assist exoskeleton of claim 13, wherein the latch further comprises a securing device for releasably securing the latch in an unlocked position and blocking the lateral portion of the channel to prevent automatic re-engagement of the latch.

17. The lift assist exoskeleton of claim 12, further comprising a thigh strut, and wherein the release mechanism comprises:
a locking plate rotationally coupled to the leg strut, the thigh strut, and the energy storage device, the locking plate comprising a latch interface; and
a latch which is slidably translatable along the thigh strut to engage with the latch interface of the locking plate in the engage position.

18. The lift assist exoskeleton of claim 12, further comprising a thigh strut, and wherein the release mechanism comprises:
a locking plate rotationally coupled to the leg strut, the thigh strut, and the energy storage device, the locking plate comprising a latch interface; and
a latch rotationally coupled to the thigh strut to engage with the latch interface of the locking plate in the engage position.

19. A lift assist exoskeleton, comprising:
a harness assembly configured for mounting to a torso of a user; and
a leg assembly comprising a leg strut, an energy storage device, and a leg interface feature, the leg strut and the energy storage device being pivotally coupled with respect to the harness assembly through a pivotal coupling comprising a pivotal offset, the energy storage device being configured to store an assistive force to assist straightening of a leg of the user toward alignment with the torso of the user, the energy storage device comprising a housing having opposing ends movable relative to one another, a spring element positioned axially within the housing, a gas spring positioned axially within the housing, and a travel limiter configured to prevent over-compression of the spring element.

20. The lift assist exoskeleton of claim 19, wherein the spring element and gas spring are arranged in series within the housing, with a first end of the spring element connected to a first end of the gas spring, a second end of the spring element connected to a first of the opposing ends of the housing, and a second end of the gas spring connected to a second of the opposing ends of the housing.

21. The lift assist exoskeleton of claim 19, further comprising:
a hip strut, the hip strut comprising a joint that couples the harness assembly to the leg assembly through a pivot axis, the pivot axis extending between 30 to 60 degrees as compared to a vertical axis of a user.

* * * * *